March 3, 1959 J. W. SMOOT ET AL 2,875,682
DEEP FAT FRYING MACHINE
Filed Oct. 6, 1955 2 Sheets-Sheet 1

INVENTORS.
JOHN W. SMOOT AND
BY JAMES J. SMOOT

Clarence E. Threedy
THEIR ATTORNEY.

March 3, 1959
J. W. SMOOT ET AL
2,875,682
DEEP FAT FRYING MACHINE
Filed Oct. 6, 1955
2 Sheets-Sheet 2
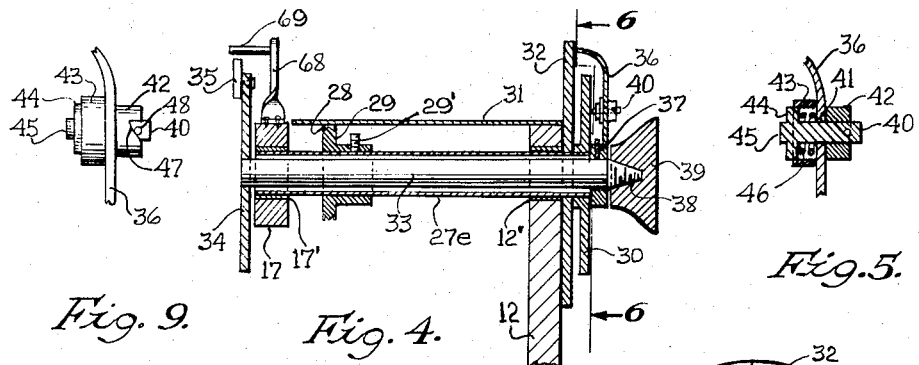
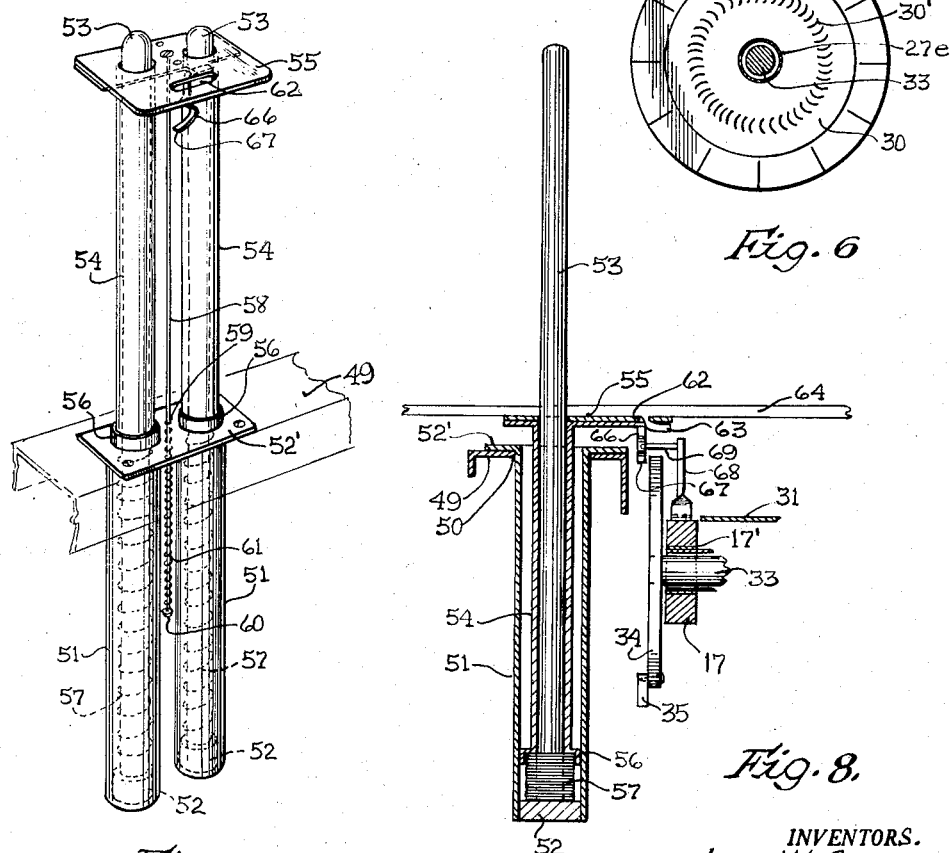
INVENTORS.
JOHN W. SMOOT AND
JAMES J. SMOOT
BY
THEIR ATTORNEY.

UNITED STATES PATENT OFFICE 2,875,682
Patented Mar. 3, 1959

2,875,682

DEEP FAT FRYING MACHINE

John W. Smoot and James J. Smoot, Logansport, Ind.

Application October 6, 1955, Serial No. 538,852

1 Claim. (Cl. 99—336)

This invention relates to new and useful improvements in a deep fat frying machine and has for its principal object the provision of a machine of this character which is automatic in its overall operation.

Another principal object of this invention is the provision in a machine of this character of an automatic timing device for controlling the cooking period and removal of the food from the deep fat frying substance.

Another and equally important object of this invention is in the provision in a machine of this character of a plurality of automatic timing devices capable of uniformity in their operation, such timers being wholly mechanical and not necessitating any conventional clock works.

Yet another and equally important object of this invention is in the provision in a machine of this character of a removable frying fat container which is of one piece construction and adapted for ease of maintenance.

Another object of this invention is the provision in a device of this character of an automatic timer control which is adapted to cooperate with timer units for uniformly cooking foods or the like.

A further object of the invention is in the provision in a deep fat frying machine of a machine which is compact, sanitary, and easily controlled and cleaned.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 4 is a fragmentary detail sectional view taken on line 4—4 of Fig. 2;

Fig. 5 is a fragmentary side sectional view of the improved timer latch pin as employed in my invention;

Fig. 6 is a plan view of a timer wheel and operating disc;

Fig. 7 is a fragmentary perspective view of the basket holding mechanism showing in dotted lines the operative parts thereof;

Fig. 8 is a fragmentary detail sectional view taken on line 8—8 of Fig. 1; and

Fig. 9 is a fragmentary side plan view of our timer latch pin.

Figure 1:
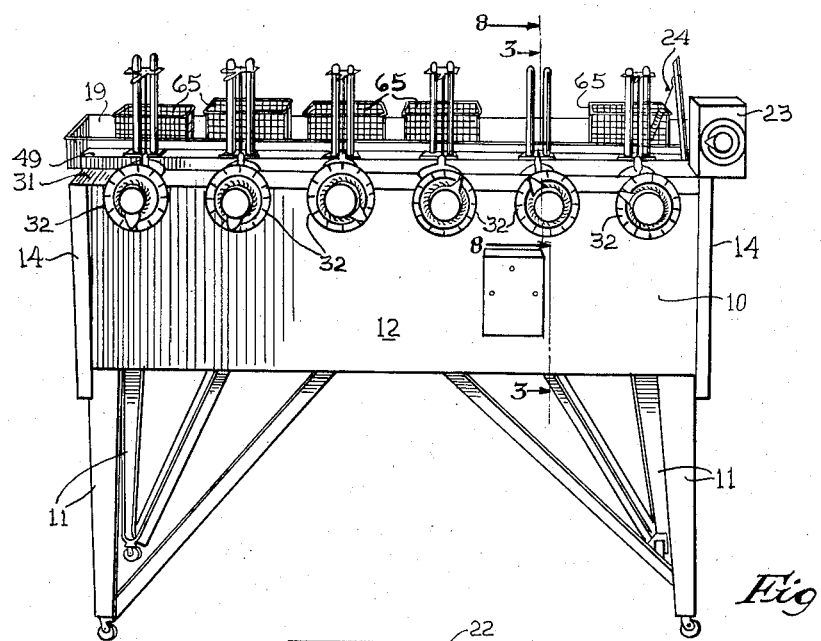
Fig. 1 is a perspective view of our deep fat frying machine.

This invention relates to a machine particularly designed for deep fat frying of potatoes, chicken, fish, and other foods which are adapted to deep fat frying methods.

The frying machine consists of a cabinet 10 supported by legs 11. The cabinet 10 is made up of a front wall 12, a rear wall 13, side walls 14, and a bottom wall 15. Extending vertically from the bottom wall 15 within the cabinet 10 is a supporting wall 16. Supported by the side walls 14 and positioned within the cabinet 10 between the supporting wall 16 and the front wall 12 is a supporting bar 17. The wall 16 together with the rear wall 13 forms an open top oven compartment containing a series of conventional gas burners 18.

A removable frying fat container 19 is provided with end and side flanges 20 terminating in vertical walls 21. The container 19 is adapted to be positioned with the flanges 20 thereof resting on the top edges of the rear wall 13, the side walls 14 and the supporting wall 16, with a portion of the container positioned in the oven over the burners 18 as viewed in Figs. 1, 2, and 3. Carried by the rear wall 13 and having open communication with the oven compartment is a suitable exhaust vent 22.

Carried by one of the side walls 14 adjacent the front wall 12 is a thermostatic control box 23 which in turn is operatively connected to a submergible thermo bulb 24. The bulb 24 when positioned in the hot fat in the container 19, will through the control box 23 maintain the burners 18 in operative condition to keep the frying fat at a substantially even temperature. Such a thermostatic control may be of any well-known construction and makes up no part of this invention except as to its inherent operative function.

Connected to the rear of the front wall 12 between such wall and the supporting bar 17 is an electric motor 25. This motor through a chain of reduction gears 26 is operatively connected to a driven tube 27. This driven tube 27 is journalled through the front wall 12 and the supporting bars 17 and its construction and operation will be hereinafter described. Through this driven tube 27 by chain drives 28 and sprocket wheels 29 are a plurality of like tubes 27a–e. Each of these tubes through its driven connection is caused to rotate in an anticlockwise direction upon energization of the motor 25.

As all of the tubes 27 to 27e are of similar construction and purpose, we will describe but one.

Figure 2:
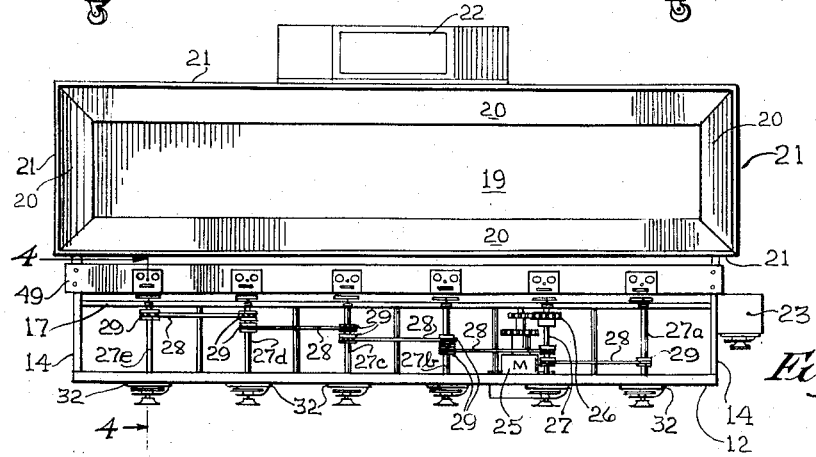
Fig. 2 is a top plan view with the baskets and cover plate removed.

In Fig. 4 it is shown that the tube 27e is journalled through bearings 12' and 17', formed in the front wall 12 and the supporting bar 17 respectively. On the front end of this tube is frictionally journalled a timer latch disc 30. This disc 30 has cut on its face a circular series of grooved cam notches 30' (see Fig. 6). Second on the tube 27e is a sprocket wheel 29 having operative connection with the chain drive 28. The sprocket wheel is secured to the tube by a set screw 29' as shown in Fig. 4. The tubes together with their chain drives are normally hidden from view by a cover plate 31 removably supported by the side walls 14 and the front wall 12 as shown in Figs. 1 and 4.

On the base of the front wall 12 and loosely embracing the tube 27e is a timing indicator 32. This indicator is fixedly attached to the wall 12 by means of welding or the like and is so constructed so as to permit the tube to rotate without interference therefrom. The exposed face of this indicator bears time indicating indicia in the form of minutes and seconds.

Projecting from the tube 27e is a shaft 33. The extremities of this shaft 33 extend beyond the ends of the tube 27e as shown in Fig. 4.

On the rear end portion of the shaft 33 is fixedly attached a trigger bearing wheel 34. This wheel has fastened adjacent its peripheral edge an adjustable trigger 35, the function of which will be hereinafter explained. Adjacent the front end of the shaft 33 and to the front of the timer latch disc 30 is journalled a time indicating finger 36. This finger 36 is attached to the shaft 33 by a set screw 37 as shown in Fig. 4. The front end of the shaft 33 is tapered and threaded as at 38 to receive a likewise threaded control knob 39. The finger 36 extends radially from its connection to the shaft 33 and the end is tapered to a point, which in turn is grooved to a point adjacent the face of the time indicator 32. Between the point of the finger 36 and its connection to the shaft 33 is a latch pin 40. The latch pin 40 is journalled through an aperture 41 formed in the finger 36. To the outer side of the finger 36 and encircling the aperture 41 is a bushing 42. The bushing 42 has an aperture formed therein of like diameter with respect to the aperture 41.

To the opposite side of the finger 36 and in confronting relation to the bushing 42 is a second bushing 43, but of a size greater than the first bushing and of the aperture 41 as shown in Fig. 5. Adapted for slidable movement in this second bushing 43 is an enlarged head 44 of the pin 40, which head carries a contact pin 45. Embracing the pin 40 between the enlarged head 44 and the finger 36 within the bushing 43 is a coil spring 46. This spring 46 forces the head 44 together with the pin 45 laterally from the finger 36 for engagement with the notches 30' of the timer latch wheel 30.

The bushing 42 has a notch 47 formed therein to receive a stop pin 48 extending transversely through the forward end of the pin 40. The arrangement is such that when the stop pin 48 is seated in the notch 47, the pin 45 will engage in the cam notch 30' of the wheel 30. However, when the pin 40 is retracted through the bushings 42 and 43 against the action of the spring 46, and rotated so as to place this stop pin 48 on the peripheral edge of the bushing 42, the point 45 together with the head 44 will be withdrawn from engagement with the notches of the wheel 30.

When the electric motor is energized, the tube 27 is caused to rotate through the chain of gears and the remaining tubes 27a to 27e will rotate in a like direction through the operative connection of the chain drives to the sprocket wheels thereof. Rotating with the tubes are the timer latch wheels 30. If the stop pin 48 of the timer finger 36 is in engagement with the notches 30' of the timer wheel 30, there results an operative connection which in turn will rotate the shaft 33 together with the trigger disc 34. Such an operation will cause the release of the frying baskets by a construction of parts to be hereinafter described.

Immediately to the rear of the support bar 17 and carried by the side walls 14 is a longitudinally extending substantially U-shaped support 49. Periodically in the bight portion of this support 49 are openings 50. Each of these openings 50 supports a double well casing 51. These well casings comprising a horizontal flange member 52' seated upon the support 49 adjacent the edges of the openings 50. Each well casing consists of two parallel depending hollow wells such as is shown in Fig. 7. The bottom of these wells are closed by a wall 52. Extending upwardly from each of these wells and equally spaced from the sides thereof are guide rods 53. These rods 53 in their free ends extend parallelly upwardly of the support 49 a distance substantially equal to the depth of the wells as shown in Figs. 7 and 8.

Slidably positioned on these rods 53 are sleeves 54. These sleeves 54 are connected together at their upper ends by a support plate 55. The lower ends of the sleeves 54 terminate into circumferential lips 56. The diameter of the lips 56 is slightly less than the diameter of the wells so as to permit slidable action therein.

Between the lips 56 and the bottom wall 52 and embracing the rods 53 are coil springs 57. These springs 57 normally urge the sleeves to their uppermost position on the rods 53 as shown in Fig. 7. To maintain the sleeves 54 upon the rods 53 and to prevent the spring 57 from urging the sleeves up and off the upper ends of the rods we provide a keeper rod 58. This keeper rod 58 extends upwardly from the support plate 55 an equal distance from each of the sleeves 54. The lower end of the rod 58 passes through an aperture 59 formed in the flange member 52' to a point below the support 49. The bottom end of the rod 58 carries a nut 60 threaded thereon. Between the nut 60 and the aperture 59 formed in the member 52' and embracing the rod 58 is positioned a coil spring 61. This spring 61 not only acts as a shock absorber when the sleeves 54 are raised on the rod 53 by action of the spring 57 in a manner hereinafter explained, but also prevents the removal of the sleeves 54 from their respective positions on the rods 53.

Figure 3:
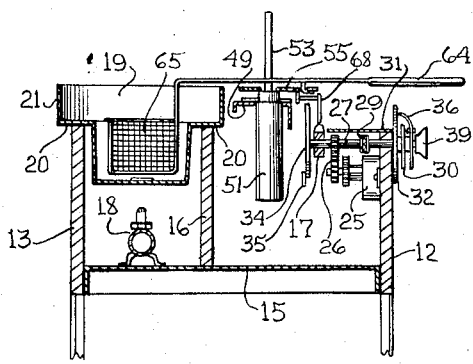
Fig. 3 is a fragmentary detail sectional view taken on line 3—3 of Fig. 1.

The support plate 55 is of such a formation that it has a portion extending toward the front wall 12 of the machine, with this portion being of a length greater than the width of the bight portion of the support 49. Adjacent the front edge of the portion of the plate 55 that overlaps the support 49 is an elongated slot 62 through which is adapted to pass a curved hook 63 carried by the underside of handles 64 of frying baskets 65. The remaining portion of the handles 64 rests upon the plate 55 and passes between the rods 53 as shown in Fig. 3.

Immediately to the rear of the slot 62 and forwardly of the rod 58 and extending downwardly from the underside of the plate 55 is a hook element 66. This hook element 66 has a depending tip 67, the purpose and function of which will be hereinafter described.

On the top surface of the supporting bar 17 directly over the center of each of the tubes and shafts 33 journalled through the bar 17 is a substantially vertical latch member 68. This latch member 68 has a laterally extending latch finger 69 which extends over and beyond the peripheral edge of the trigger disc 34.

The arrangement and function of the above described parts are as follows: the temperature of the frying fat is maintained through a thermostatic control box 23. The baskets 65 through the hooks 63 thereof are connected to the plate 55. When for example, potatoes are to be fried, they are placed in the basket while it is in its raised position as shown in Fig. 1. The time indicator finger 36 is rotated in an anti-clockwise direction until the point corresponds to the desired time of cooking as indicated on the time indicator 32. The point 45 of the latch pin 40 is positioned in a corresponding notch 30' of the latch wheel 30 and is permitted to rotate therewith. From the foregoing description it will be recalled that the tubes are continually rotating under the energization of the motor 25. The operative connection now being completed between the tube and the timer finger 36 which is fixedly carried by the shaft 33, will in turn cause the trigger disc 34 to rotate in an anti-clockwise direction together with the tube. The basket is then depressed, causing the sleeves 54 to pass down into the wells 51. The hook element 66 carried by the underside of the support plate 55 will engage the latch finger 69 of the latch pin 68 as carried by the bar 17 and be held in depressed position with the basket submerged in the frying fat. As the shaft 33 continues to rotate, it will bring the trigger 35 into engagement with the depending tip 67 of the hook element 66 causing it to bend into a position so as to be released from the latch finger 69. Under the action of the coil spring 57 the support plate 55 together with the basket will be raised to a position as shown in Fig. 1 with the food contained in the basket out of the frying fat.

From the foregoing it is obvious that we have provided a simple yet efficient timing mechanism for controlling the cooking period of food contained in cooking baskets submerged in frying fat.

While we have illustrated and described the preferred form of construction for carrying out invention into effect, this is capable of variation and modification without departing from the spirit of the invention. We, therefore, do not wish to be limited to the precise details of construction set forth, but desire to avail ourselves of such variations and modifications as come within the scope of the appended claim.

Having thus described our invention, what we claim as new and desire to protect by Letters Patent is:

A deep fat frying machine comprising a cabinet providing an oven compartment, heating means for said oven a plurality of cooking baskets movable independently relative to said oven, positioning means provided by said cabinet for each of said baskets and operable thereon for normally maintaining each of said baskets in one position relative to said oven, a movable plate carried by each of said positioning means and providing operative connection between each of said baskets and its positioning means, a stationary latch member provided by said cabinet adjacent each of said positioning means, a hook carried by each of said movable plates and engageable with its associated stationary latch member for latching said basket in an operative position with respect to said oven when said plate and said basket are moved from said one position relative to said positioning means, a timing device for each of said baskets for regulating the period of time a basket is latched in said operative position with respect to said oven, each device comprising a continuous driven hollow sleeve, a motor operatively connected to each of the sleeves for continuously rotating the same, a rotatable releasing trigger freely carried by one end of a shaft journalled in said hollow sleeve, a timer plate for each of said baskets carried by and rotatable with each of the sleeves, a connecting pin for individually operatively connecting said shaft to said plate for rotation therewith so as to rotate said trigger into engagement with said hook to release said hook from said stationary latch member to permit said positioning means to position said basket in said normal one position relative to said oven.

References Cited in the file of this patent

UNITED STATES PATENTS

| | | |
|---|---|---|
| 915,711 | Blanchard | Mar. 16, 1909 |
| 1,377,983 | Lamb | May 10, 1921 |
| 1,377,984 | Lamb | May 10, 1921 |
| 1,529,342 | Christy | Mar. 10, 1925 |
| 1,986,412 | Rudolph | Jan. 1, 1935 |
| 2,232,203 | Bemis | Feb. 18, 1941 |
| 2,470,548 | Desjardins | May 17, 1949 |
| 2,572,934 | Hummel | Oct. 30, 1951 |